United States Patent [19]

Kamura et al.

[11] 4,302,768

[45] Nov. 24, 1981

[54] SYSTEM FOR REDUCING OR SUPPRESSING NOISE COMPONENTS IN TELEVISION SIGNAL

[75] Inventors: Takashi Kamura; Hiroshi Taniguchi, both of Hirakata, Japan

[73] Assignee: Matsushita Electric Industrial Co., Ltd., Osaka, Japan

[21] Appl. No.: 102,996

[22] Filed: Dec. 12, 1979

[30] Foreign Application Priority Data

Dec. 14, 1978 [JP] Japan .................................. 53-155629

[51] Int. Cl.$^3$ ............................................. H04N 9/535
[52] U.S. Cl. ........................................ 358/36; 358/167
[58] Field of Search ................................... 358/36, 167

[56] References Cited

U.S. PATENT DOCUMENTS 4,009,334  2/1977  Sypula ................................... 358/36
4,058,836 11/1977  Drewery et al. ..................... 358/36

Primary Examiner—Richard Murray
Attorney, Agent, or Firm—Burgess, Ryan and Wayne

[57] ABSTRACT

A system for reducing or suppressing the noise components in the TV signal wherein the component representative of the difference between the as-input (or as-received) TV signal and the TV signal which has been delayed by one horizontal scanning period is derived, the difference component is subjected to the amplitude limitation, and the noise components in the TV signal reproduced by VTR or the like are removed or suppressed by a comb filter comprising said as-input TV signal and the amplitude-limited difference component.

7 Claims, 7 Drawing Figures

4,302,768

SYSTEM FOR REDUCING OR SUPPRESSING NOISE COMPONENTS IN TELEVISION SIGNAL

BACKGROUND OF THE INVENTION

1. Field of the Invention

The present invention relates to a circuit for processing a television signal (to be referred to as "the TV signal" hereinafter in this specification) which is very effective in improving the signal-to-noise (S/N) ratio of the TV signal, especially when applied to the TV signal processing circuits in magnetic recording and reproducing apparatus.

2. Description of the Prior Art

In order to improve the signal-to-noise ratio of the luminance signal of the TV signal, there has been devised a system wherein the TV signal is delayed by one horizontal scanning period (to be referred to as "1H" hereinafter in this specification) and added at the same level to the input TV signal which has not been delayed, whereby the so-called comb filter may be obtained whose filtering effects may improve the S/N ratio. (With this system, the improvement by 3 dB can be attained.) However, this system cannot avoid the degradation in the resolution in the vertical direction and has not been used for a commercial use.

SUMMARY OF THE INVENTION

The primary object of the present invention is therefore to provide a system whose S/N ratio improving effect is substantially similar to that attained by the comb filter of the type described above and which may effectively reduce or suppress the noise components in the TV signal, especially unwanted, uniform (or uniformly repeated) noise components developed in the case of the magnetic recording and reproducing, without causing any degradation in resolution in the vertical direction.

Briefly stated, the present invention is featured in that the difference signal between the 1H delayed TV signal and the as-input TV signal is extracted, the extracted difference signal is subjected to the amplitude limitation, and a comb filter is provided by the amplitude-limited difference signal and the as-input TV signal.

DETAILED DESCRIPTION OF THE PREFERRED EMBODIMENTS

Figure 1:
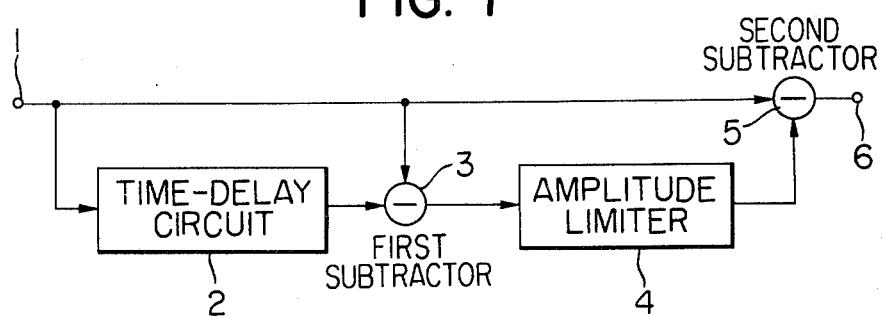
FIG. 1 is a block diagram of a first embodiment of the present invention.
Figure 2A:
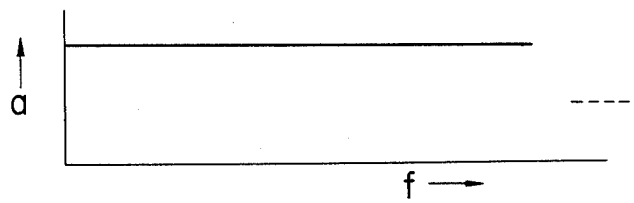
FIG. 2, including a-c, shows the frequency-vs.-gain characteristic curves of the system shown in FIG. 1 and used for the explanation of the mode of operation thereof.
Figure 2B:
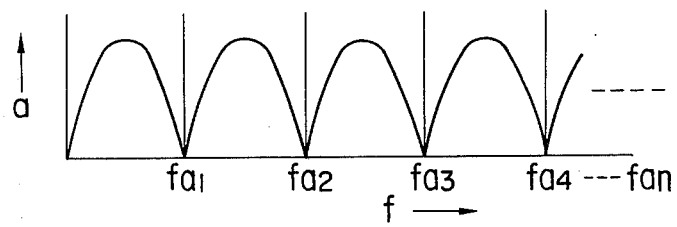
Figure 2C:
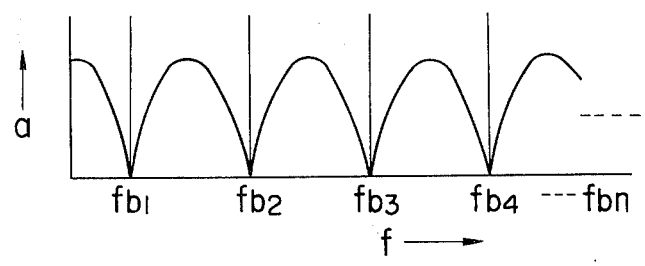
Figure 3:
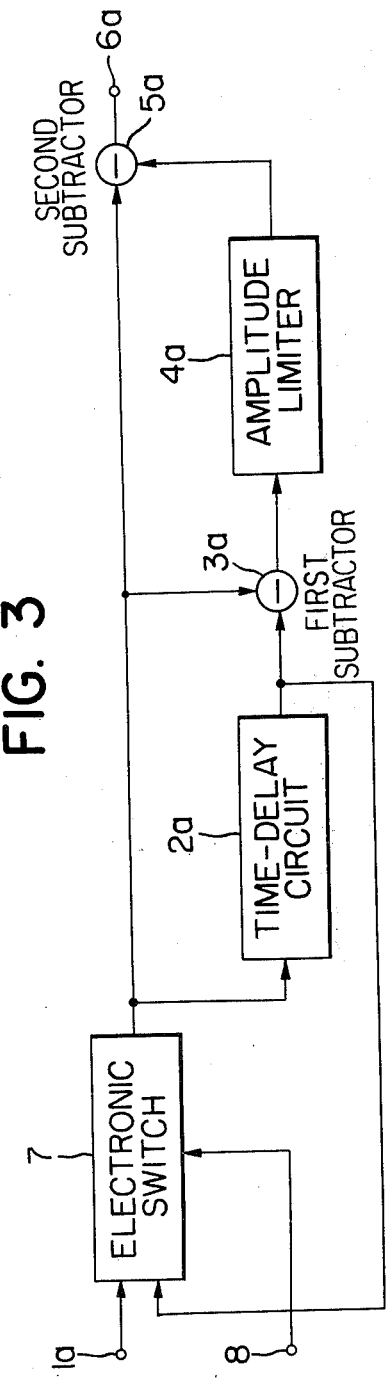
FIG. 3 is a block diagram of a system which is similar to that shown in FIG. 1 but is added with the dropout compensation means.

First Embodiment, FIGS. 1 through 3

Referring first to FIG. 1, the first embodiment of the present invention comprises in general an input terminal 1 to which is applied the TV signal, a time-delay circuit 2 for delaying the transmission of the input TV signal for 1H, a first subtractor 3 the output of which is proportional to the difference between the as-input TV signal from the input terminal 1 and the delayed TV signal from the time-delay circuit 2, an amplitude limiter 4, a second subtractor 5 the output of which is proportional to the difference between the as-input TV signal and the output signal from the amplitude limiter 4 and an output terminal 6.

The amplitude limiter 4 in accordance with the present invention is so designed and constructed that when the input signal is low in level, its response is linear, but when the input signal exceeds a predetermined amplitude, it functions as a clipper. Therefore when the output or difference signal from the first subtractor 3 has the amplitude below a predetermined level, the noise components having the frequency which has $\frac{1}{2}$ line offset relation between successive horizontal scanning line is suppressed almost completely, but the output or difference signal having the amplitude above a predetermined level will not be suppressed.

More particularly, the noise components which are included in the input TV signal and have low levels are suppressed almost completely, but the edge component of the signal is not affected when the difference signal has the amplitude in excess of a predetermined level for example at the picture edge having little line correlation. As a result, substantially no degradation of resolution will result.

The first embodiment will be further described in detail from the standpoint of the frequency characteristic with reference to FIG. 2 showing the relation between the frequency and gain, the frequency being plotted along the abscissa while the gain, along the ordinate. When the function of the signal applied to the input terminal 1 with respect to the frequency is such as shown in FIG. 2A, the function of the output signal from the first subtractor 3 forms the so-called comb filter as shown in FIG. 2B, in which $f_{a1}, f_{a2}, \ldots,$ and $f_{an}$ are $n\,(1/T_D)$, where n is a positive integer and $T_D$ is a time (H time) delayed through the circuit 2.

FIG. 2C shows the transmission characteristic of the signal applied to the input terminal 1 and transmitted to the output terminal 6 when the signal level is too low for the amplitude limiter 4 (that is, when the signal level is such that the amplitude limiter 4 will not suppress the amplitude). In FIG. 2C; $f_{b1}, f_{b2}, \ldots,$ and $f_{bn}$ are $(2n-1)/2T_D$, where n is a positive integer and $T_D$ is 1H. Thus the comb filter for the brightness or luminance signal in the TV signal may be formed.

When, as described above, the comb filter is so designed and constructed as to suppress only the signal with a low amplitude, the limit level of the amplitude limiter 4 may be set to less than 1/10 of the peak-to-peak value of the signal because in practice the noise having random components is less than 1/10 in terms of the peak-to-peak value of the TV signal. As a result, resulting degradation in resolution of the picture in the vertical direction may be almost eliminated.

The present invention may attain very effective noise reduction especially when it is applied to the home and industrial color called EIAJ TYPE-I VTR which employs the color TV signal processing system, wherein the luminance signal is frequency-modulated, while the chrominance subcarrier is converted into the low frequency signal and superposed on the frequency-modulated luminance signal for recording or to the VTR systems which employ the signal processing system similar to EIAJ TYPE-I VTR in some respects to be described below. In the EIAJ TYPE-I VTR, the color subcarrier which is converted to the low frequency has the frequency $f_s$ of about 767 KHz, which has ¼ line offset relation between successive horizontal scanning line; that is $f_s=[(an-1)/4]f_H$ where $f_H$ is the horizontal scanning frequency and n is a positive integer. The main cross modulation components of the signal produced by the distortions in the transmission system of VTR consisting of the magnetic tape and the electromagnetic conversion system are $f_m \pm 2f_s$, where $f_m$ is the frequency of the FM carrier. $f_m \pm 2f_s$ are demodulated into the signal having the frequency $2f_s$ by an FM demodulated. Since $f_s$ is $(2n-1)f_H/4$, $2f_s$ is equal to $(2n-1)f_H/2$. The cross modulation components which are contained in the angular modulated luminance signal and has the frequency $2f_s$ has ½ line offset relation so that they may be easily eliminated by the circuit in accordance with the present invention.

The signal processing system of the present invention may attain more remarkable effects when it is applied to the reproduced signal processing circuit of the recording and reproducing apparatus employing the so-called FM carrier interleaving system disclosed in Japanese laid open patent Nos. 51-29111 and 52-105729 (corresponding to U.S. Pat. No. 4,010,490). That is, according to this system wherein the TV signal is frequency modulated and then recorded, the FM modulation frequency is offset by $(2n-1)f_H/2$ between the adjacent signal tracks on the recording medium in order to improve the recording density and in the reproduction the leakage components are visually suppressed on the TV piecture by reversing the phases of the signals, which leak from the adjacent tracks and are reproduced, between the adjacent horizontal scanning lines. That is, the leakage components from the adjacent tracks are reversed in phase in the adjacent horizontal scanning lines. In other words, the leakage components are offset in successive horizontal scanning lines. Therefore, they may be effectively eliminated by the circuit of the present invention. In the case of the removal of the cross modulation components between the luminance and chrominance signals the cross modulation signal frequency $f_s$ is about 767 KHz and its twice is about 1.534 MHz. In the case of the removal of the leakage signal from the adjacent tracks by the combination of the FM carrier interleaving signal recording system and the circuit of the present invention, the demodulated cross talk components are concentrated in a relatively low frequency range. As a result, in both cases even when the band of the signal which is delayed by 1H is a relatively nallow band of slightly wider than 1.5 MHz, noise suppression is effectively achieved.

Furthermore, according to the circuit arrangement of the present invention, it is very easy to add the so-called dropout compensation function; that is, the function for compensating for the dropouts during the reproduction of the TV signal as will be described below with reference to FIG. 3.

Referring to FIG. 3, 1a is an input terminal; 2a is a time-delay circuit for delaying the input signal for 1H; 3a is a first subtractor for extracting the difference between two signals; 4a, an amplitude limiter; 5a, a second subtractor for cancelling the signal component, which is derived from the amplitude limiter 4a, in the signal applied to the input terminal 1; and 6a, an output terminal. In addition to the circuit components shown in FIG. 1, an electronic switch 7 and its input terminal 8 to which is applied the switching signal. When no dropout occurs, the electronic switch 7 outputs the signal which is applied to the input terminal 1a. When the dropout occurs, the signal derived from the dropout detector, which is disposed outside, is applied to the switching signal input terminal 8 of the electronic switch 7 so that in response to the detection signal the electronic switch 7 outputs the signal which is applied to the other input terminal; that is, the terminal connected to the output terminal of the time-delay circuit 2a. By this switching, the signal in which the dropout occurs is replaced with the signal delayed by 1H and the compensation signal is input to the time-delay circuit when the dropout occurs so that even when the dropout should continue for longer than 1H, the dropout compensation may be made. According to the block diagram arrangements which are shown in FIGS. 1 and 3 as the examples of the present invention, the base band video signal must be input to and output from the time-delay circuits 2 and 2a. That is, when for instance a charge-transfer time delay element is used as a time delay element for delaying the signal for 1H, a driver for the charge transfer element and an input-output circuit for that element are needed. When an ultrasonic time delay element is used as a time delay element for delaying the signal for 1H, it is required that the video signal be converted into the transmission form adapted to be transmitted through said element (for instance, the video signal being AM or FM modulated) and that after the signal has been delayed, the reconversion be made. When an element such as an ultrasonic time delay element which is advantageous in the signal transmission of the signal which is semewhat modulated because of the transmission characteristics of said element is used as an element for delaying the signal for 1H, and when the dropout compensation function is added to the circuit of the present invention, the circuit arrangement which is different from that shown in FIG. 3 is advantageous as a circuit arrangement capable of attaining both functions in view of the signal transmission characteristics and circuit arrangement. One example is shown in FIG. 4.

Figure 4:
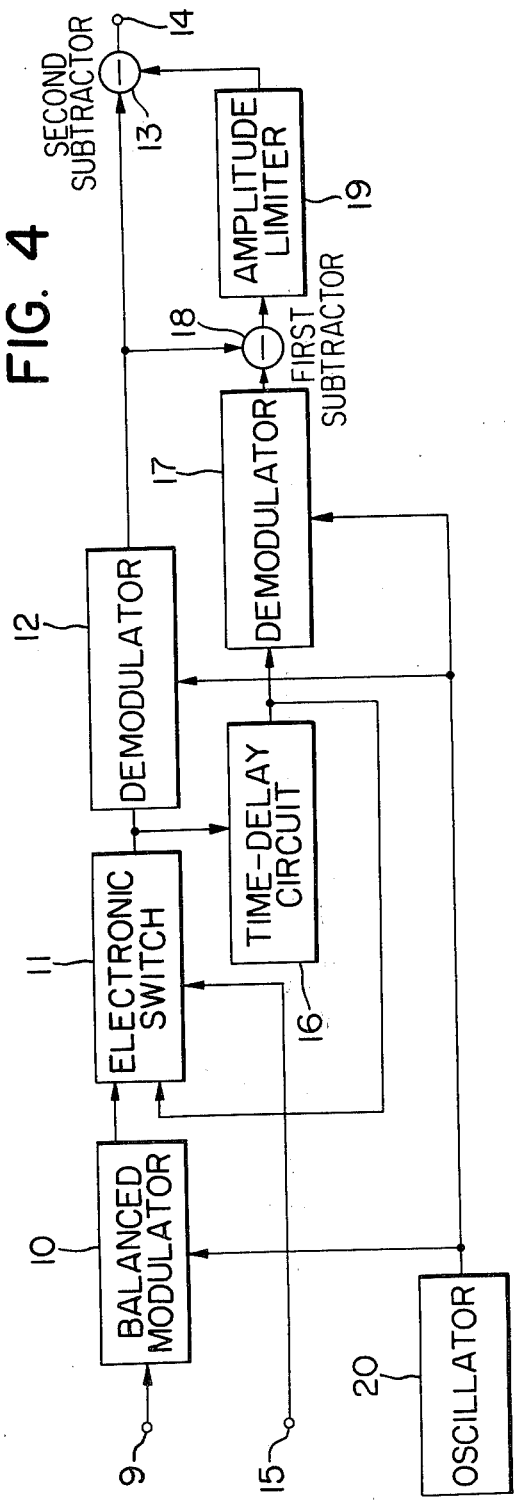
FIG. 4 is a block diagram of a second embodiment of the present invention, the system being added with a dropout compensating means.

FIG. 4 shows an example in which the AM modulation system wherein the carrier is suppressed is employed as a system for modulating the signal which is transmitted through a time delay element for delaying the signal for 1H and the synchronous demodulation system is employed as a demodulation system. Each block shown in FIG. 4 will be described. In FIG. 4, 9 is an input terminal to which is applied the TV signal; 10, a balanced modulator; 11, an electronic switch with two input terminals, the signal applied to one input terminal being transmitted to the output terminal while in response to the signal applied to a switching signal input terminal 15 the input signal applied to the other input terminal being transmitted to the ouput terminal; 12, a demodulator consisting of a first synchronous demodulator; 16, a time delay circuit consisting of an ultrasonic time delay line for delaying the signal for 1H; 17, a demodulator consisting of a second synchronous demodulator or detector; and 20, a oscillator which supplies the carrier frequency signal to the modulators 10 and first and second demodulators 12 and 17 so as to operate them. The output frequency $f_c$ of the oscillator 20 is the frequency adapted to transmit the modulated signal through the time delay circuit and is set as $f_c$ is equal to $n/T_D$, where n is a positive integer and $T_D$ is the time delay of the signal through the transmission path from the modulator 10 to the demodulator 17 including the time-delay circuit 16 in order to effect the synchronous demodulation. 13, 14, 18 and 19 correspond to 5, 6, 3 and 4, respectively, shown in FIG. 1 and have the equivalent functions. 18 is a first subtractor for extracting the difference between two input signals; 19, an amplitude limiter; 13, a second subtractor for subtracting the signal from the amplitude limiter 19 from the output signal from the first demodulator 12; and 14, an output terminal from which is derived the output from the second subtractor 13. With the circuit arrangement shown in FIG. 4, when no dropout occurs, the function is same as that of the circuit shown in FIG. 1, but when the dropout occurs, the signal derived from a dropout monitor for detecting the dropout is applied to the input terminal 15 and received by the electronic switch 11 shown in FIG. 4 so that the input signal which is normally derived from the modulator 10 is switched to the signal which is derived from the time delay circuit 16 and is applied to the first demodulator 12, whereby the dropout may be compensated for. Concurrently, the output from the electronic switch 11 is also applied to the time delay circuit 16 so that even when the dropout should continue for longer than 1H, the dropout may be compensated for. When the dropout occurs, the signal which has been transmitted through the time delay circuit 16 is applied to the second demodulator 17, and the difference between the signal applied to the second demodulator 17 and the signal applied to the first demodulator 12 is depending upon whether either of the signals has passed through the electronic switch 11 more than once than the other. In practice, it is possible to apply the signals to both the first and second demodulators 12 and 17 at the same instant. It follows therefore that when the dropout occurs, no difference signal component is derived from the second subtractor 18 which outputs the difference between the outputs from the first and second demodulators 12 and 17. As a result, with the circuit arrangement as shown in FIG. 4, when the dropout occurs, the function of the circuit of the present invention is suppressed. With the circuit arrangement shown in FIG. 4, even when the dropout continues for longer than 1H, it is not needed to repeat the modulation and demodulation before and after the time delay line for delaying the signal for 1H and the degradation of the signal due to the repetitive modulations and demodulations may be avoided. In these respects the circuit arrangement shown in FIG. 4 is advantageous over that shown in FIG. 3 in case that ultrasonic delay lines are utilized as the delay circuits 2 and 16. In the embodiment shown in FIG. 4, various merits and demerits of circuit characteristics result depending upon the system for modulating the signal which is to be transmitted through the time delay line for delaying the signal for 1H. For instance in the AM system as shown in FIG. 4 wherein the carrier is suppressed, it is possible to overlap the sidebands of the modulated signal with the band of the signal applied to the demodulator so that a lower carrier frequency may be used. Furthermore it is very simple in demodulation to suppress the level of the carrier component derived from the demodulator by far below the output level of the demodulated signal. The circuit arrangement shown in FIG. 4 shows an example of the carrier-suppressed AM system, but it is apparent to those skilled in the art that even when the conventional amplitude modulation and demodulation system is employed, the same effects are attained in respect to the functions of the dropout compensation and removal of noise.

Figure 5:
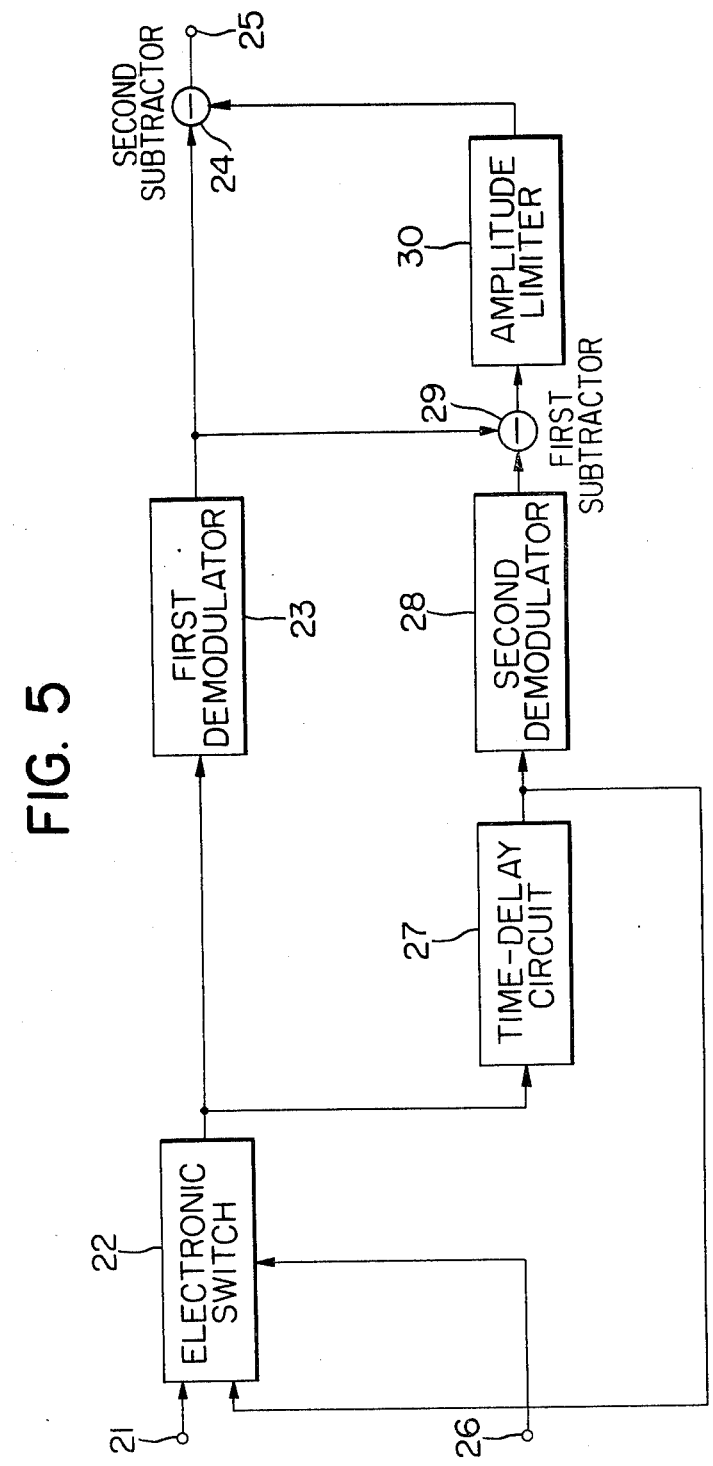
FIG. 5 is a block diagram of a third embodiment of the present invention, the system being added with a dropout compensating means.

For instance, when the reproduced angle-modulated signal is applied to a time delay circuit for delaying the signal for 1H and the 1H delay is attained by the demodulation of the output from the time delay circuit in the recording and reproducing device wherein the TV signal is angle modulated and recorded, a circuit arrangement as shown in FIG. 5 may be used. In FIG. 5, 21 is an input terminal to which is applied the angle modulated video signal reproduced from a recording medium; 22, an electronic switch similar both in construction and mode of operation to that shown in FIG. 4 at 11; 23, a first demodulator which demodulates the angle modulated signal; 26, a switching signal input terminal of the electronic switch which is similar to that shown in FIG. 4 at 15; 27, a 1H delay circuit consisting of an ultrasonic time delay line; 28, a second demodulator which demodulates the signal transmitted through the time delay circuit 27; and 29, 30, 24 and 25 shown in FIG. 5 corresponds to 18, 19, 13 and 14, respectively, shown in FIG. 4 and have the equivalent functions. 29 is a first subtractor for extracting the difference component between the two input signals applied thereto; 30, an amplitude limiter; 24, a second subtractor for the signal derived from the amplitude limiter 30 from the output signal from the first demodulator 23; and 25, an output terminal from which is derived the output signal from the second subtractor. With the circuit arrangement shown in FIG. 5, when the dropout occurs, the angle modulated signal is switched and its compensation signal is applied so that the discontinuity in phase occurs in the angle modulated signal at the time of switching. That is, in the case of the amplitude modulation, when the carrier frequency is set as $f_c$ is equal to $n/T_D$ as described above, the carriers are made to be in the same phase at the instant of switching, but in the case of the angle modulation, the phase angle of the carrier is modulated depending upon the signal to be modulated so that when switching is made at any point in time of the input signal, the elimination of the discontinuity in phase between the switched modulated signals cannot be guaranteed essentially. Therefore it follows that with the system shown in FIG. 5, the generation of noise due to the switching of the signals demodulated at the time of switching cannot be avoided. However, as is apparent from the comparison between the systems shown in FIG. 4 and FIG. 5, in the system shown in FIG. 5 the modulator may be used in common with that of the recording and reproducing apparatus. Furthermore, the system shown in FIG. 5 has the merit that the first demodulator shown at 23 in FIG. 5 may be used in common with that of the recording and reproducing apparatus.

As described hereinbefore, the present invention is very effective not only in improving the S/N ratio of the TV signal but also in improving the TV image qualities by the removal of the signals leaked from the adjacent signal tracks and of the cross modulation components between the luminance and color signals from the luminance signal when the present invention is applied to the color VTR. In addition, the present invention may permit the very easy addition of the dropout compensation function.

What is claimed is:

1. A system for reducing the noise components in the television (TV) signal comprising: at least a first means for delaying the input TV signal by one horizontal scanning period;

a second means for obtaining the difference signal between said delayed TV signal and the input TV signal, a third means for limiting the amplitude of the difference signal derived from said second means, and a fourth means for combining said input TV signal and the output signal from said third means so as to produce an output signal in which of the noise components having the frequency of or adjacent to $(2n-1)f_H/2$, where n is a positive integer and $f_H$ is the horizontal scanning frequency, are removed or suppressed.

2. A system as set forth in claim 1, wherein the input TV signal is that is transmitted through a recording and reproducing system and includes a luminance component signal and a chrominance component signal the carrier of which is frequency converted so that the frequency of the main component of cross modulation component which is generated between the angular modulated luminance component signal and the frequency converted chrominance component signal when said TV signal is transmitted through said system, has a ½ line offset relation between successive horizontal scanning lines.

3. A system as set forth in claim 1, wherein said input TV signal is the signal reproduced from a recording medium on which is recorded the TV signal by frequency modulating said TV signal and shifting the frequency of said frequency modulated TV signal by $(2n-1)f_H/2$, for every other recording track.

4. In a color television signal recording and reproducing system of the type in which the luminance signal component in the color television signal is angular modulated, the carrier color signal in said color television signal is converted into a signal having a frequency lower than that of said carrier color signal, and said frequency converted carrier color signal and said angular modulated luminance signal are superposed and recorded on and reproduced from a signal recording medium, wherein the carrier frequency of said frequency converted carrier color signal is so selected that the major component of the cross modulated component which results from recording said superposed two signals and which is mixed in the luminance signal obtained by the demodulation of said angular modulated luminance signal has ½ line offset relation with respect to said demodulated luminance signal, whereby the signal recorded on said recording medium is reproduced, said angular modulated luminance signal is separated from the superposed signal by the frequency band separation and is demodulated, a system for reducing the cross modulation noise components in the reproduced television signal wherein said demodulated luminance signal is distributed into three channels, said demodulated luminance signal which is distributed to a first channel is applied to a first means which delays the television signal for one horizontal scanning period, the output from said first means is applied to one of two input terminals of a second means which derives the difference between the signals applied to said two input terminals thereof, said demodulated luminance signal which is distributed into a second channel is applied to the other input terminal of said second means, the output from said second means is applied to a third means which limits the amplitude of the input signal applied thereto, and the demodulated luminance signal distributed into a third channel is combined with the output signal from said third means, whereby said cross modulated component which is produced in the signal recording and reproducing process, and mixed into said reproduced luminance signal having ½ line offset relation with respect thereto is removed.

5. In a television signal recording and reproducing system of the type in which the television signal is angular modulated and recorded on and reproduced from a signal recording medium in which signal recording tracks are arrayed in parallel to each other, a system for reducing the noise components in the television signal wherein said angular modulated television signal is recorded on said signal recording medium in such a way that the carrier frequencies of the angular modulated television signal components recorded on the adjacent signal recording tracks are shifted from each other by $(2n-1)f_H/2$, where $f_H$ is the horizontal scanning frequency and n is a positive integer, in the signal reproduction process, said angular modulated television signal is remodulated and distributed into three channels, said demodulated television channel which is distributed to a first of said three channels is applied to a first means which delays the television signal for one horizontal scanning period, the output from said first means is applied to one of two input terminals of a second means which produces the difference between the signals applied to said two input terminals thereof, said demodulated television signal which is distributed to a second channel is applied to the other input terminal of said second means, the output from said second means is applied to a third means which limits the amplitude of the input signal applied thereto, and the output from said third means is combined with said demodulated television signal which is distributed to a third channel, whereby the signal components leaked from the adjacent signal recording tracks are removed or suppressed to a substantially negligible level.

6. A noise suppression circuit for a video tape recorder capable of recording and reproducing a television signal, comprising:

means for delaying the television signal for one horizontal line interval;

means for subtracting the delayed television signal from the undelayed television signal to obtain a difference signal;

means for amplitude limiting said difference signal; and means for subtracting the amplitude-limited difference signal from the undelayed television signal to reduce the noise signal components of said undelayed television signal.

7. The noise suppression circuit according to claim 6, wherein said television signal is frequency modulated and is reproduced from a video magnetic tape, said television signal having been recorded on said magnetic tape so that the carrier frequency thereof is shifted by an odd multiple of half the horizontal line frequency between adjacent tracks.

* * * * *

UNITED STATES PATENT AND TRADEMARK OFFICE
CERTIFICATE OF CORRECTION

PATENT NO. : 4,302,768
DATED : November 24, 1981
INVENTOR(S) : Takashi Kamura, et al It is certified that error appears in the above—identified patent and that said Letters Patent is hereby corrected as shown below:

In the Abstract:   line 6, after "to" delete "the"

In the Specification:

Col. 1, line 49:   "a-c" should be --A-C--

Col. 3, line 34:   "piecture" should be --picture-- line 45:   delete "twice" and insert --second harmonic-- line 53:   "nallow" should be --shallow--

Col. 4, line 34:   "semewhat" should be --somewhat--

Signed and Sealed this

Eleventh Day of January 1983

[SEAL]

Attest:

GERALD J MOSSINGHOFF

Attesting Officer     Commissioner of Patents and Trademarks